United States Patent [19]

Becker et al.

[11] 4,203,752
[45] May 20, 1980

[54] MULTI-STATION GLASS-FORMING MACHINE

[75] Inventors: Kurt Becker, Obernkirchen; Hermann Büogert, Aeutal; Siegfried Schwarzer, Stockse; Hans-Georg Seidel, Rinteln, all of Fed. Rep. of Germany

[73] Assignee: Hermann Heye KG, Obernkirchen, Fed. Rep. of Germany

[21] Appl. No.: 947,185

[22] Filed: Sep. 29, 1978

[30] Foreign Application Priority Data

Oct. 18, 1977 [DE] Fed. Rep. of Germany ....... 2746675

[51] Int. Cl.² .......................... C03B 9/44; C03B 35/00
[52] U.S. Cl. .......................... 65/163; 65/158; 65/227; 65/323; 198/490; 198/740
[58] Field of Search ............... 65/29, 158, 160, 163, 65/227, 323, DIG. 13, 323, 348; 198/488, 490, 740

[56] References Cited

U.S. PATENT DOCUMENTS

| 3,595,365 | 7/1971 | Faure | 198/490 |
|---|---|---|---|
| 4,007,028 | 2/1977 | Bublitz | 65/163 |

Primary Examiner—Arthur D. Kellogg
Attorney, Agent, or Firm—Michael J. Striker

[57] ABSTRACT

Each station has a push-off unit which transfers glass articles produced at such station onto a common outfeed conveyor. Each push-off unit comprises a cylinder-piston unit mounted for swinging movement on a vertical swing shaft, the piston thereof carrying a push-off arm. The push-off arm extends and engages the articles to be transferred, the cylinder swings towards the belt transferring the article, and the push-off arm retracts and the cylinder swings back. The push-off units of the plural stations are activated sequentially, in correspondence to the sequence in which glass gobs are fed into the respective machine stations. Plural electric motors are provided, one per station, and the swing motion of the push-off unit is generated by the respective electric motor. The rotation of each electric motor is controllable, by open- or closed-loop control, independently of the other electric motors. The operator selects the sequence in which the electric motors are to be activated. A common or shared desired-rpm voltage is applied to all electric motors, sequentially. The electric motors drive the push-off units through respective crank and rocker mechanisms.

17 Claims, 17 Drawing Figures

MULTI-STATION GLASS-FORMING MACHINE

BACKGROUND OF THE INVENTION

The present invention concerns, especially, multi-station glass-forming machines, with each station provided with a deposit location at which the articles produced at that station are deposited. A common outfeed conveyor extends along the plural stations and carries produced articles away. Each station is provided with an article-transfer unit which, when activated, transfers articles from the respective deposit location onto the common outfeed conveyor. In the context of glass-producing machines, the article-transfer unit typically has the form of a pressure-fluid-activated cylinder-and-piston unit. The cylinder of the unit is swingable about a vertical swing axis. The piston of the unit carries an extendable-retractable push-off arm. When activated, the push-off arm extends, engaging behind the article to be transferred, whereupon the cylinder swings and the push-off arm moves the article onto the outfeed conveyor. Thereafter, the push-off arm retracts and the cylinder swings back to starting position.

One known multi-station glass-forming machine of this type comprises a main control shaft which mechanically controls the operation of the article-transfer units of the plural stations. The main control shaft drives an additional, auxiliary control shaft on which is adjustably carried a plurality of control cams, one for each station. Accordingly, all these control cams are rotated synchronously by the auxiliary control shaft. Before commencing actual machine operation, it is necessary that the angular position of each individual control cam be properly adjusted, and that the angular positions of all control cams be properly adjusted relative to one another, such that the operations controlled by the control cam occur in the proper sequence and with exactly correct timing. The angular positions or phases of the plural control cams must be staggered such that the article-transfer units at the stations of the multi-station glass-forming machine are activated in a sequence the same as the sequence in which glass gobs are being fed to the individual stations for article production. The individual control cams are all identical but, as already stated, must be preadjusted with regard to their respective angular positions on the auxiliary control shaft carrying them.

With conventional multi-station glass-forming machines of this type, it will often happen in operation that the series of glass articles transferred onto the common outfeed conveyor are observed not to be identically spaced one from the next. However, identical spacing of all articles on the common outfeed conveyor, irrespective of what stations they are coming from, is to be considered a prerequisite for optimum performance of whatever article-handling equipment is fed by the outfeed conveyor. Accordingly, in practice, if non-identical spacing develops in the articles transported on the common outfeed conveyor, it becomes necessary to disengage the auxiliary control shaft, hold it arrested and adjust the angular positions of one or more control cams appropriately. It is out of the question to safely attempt this adjustment with the auxiliary control shaft operating at full speed. Also, it is to be noted that non-identical spacing of the outfed articles can happen due to a variety of causes. For example, if one station of the machine is taken out of operation, this evidently will introduce a corresponding large gap into the series of articles on the conveyor. Likewise, because the operation of the plural article-transfer units may be somewhat different one to the next, then if the cams are adjusted to maintain identical article spacing at one conveyor-belt speed, these adjustments may have to be redone if the speed of the common outfeed conveyor is then changed. With the auxiliary control shaft thusly disengaged, no transfer of finished glass articles onto the outfeed conveyor can occur. Thus, it is also necessary to interrupt the feeding of glass gobs to the multi-station glass-forming machine, while adjusting the cams. This is self-evidently undesirable from the viewpoint of productivity. Additionally, thermal problems may arise; when machine operation is interrupted, the thermal equilibrium which the machine develops after steady operation is disturbed and, when glass begins again to be fed into the machine, faulty articles are produced until such time as thermal equilibrium is gradually reestablished. However, the worst of all the inconveniences in this typical prior-art approach is that, after all these adjustments have been made, the success of the adjustments can only be evaluated by starting the machine up again, and if further adjustment proves necessary—which will often be the case—then one must start all over.

Another shortcoming of the type of multi-station machine in question is that, because the plural article-transfer units are activated sequentially by their respective control cams, it is not possible, e.g., for test purposes, to activate all the article-transfer units in unison, i.e., to see which, if any, are operating differently from the others.

U.S. Pat. No. 4,007,028 to Bublitz et al. discloses a computerized multi-station glass-forming machine which, of course, must likewise provide the adjustabilities already present with cam-controlled machines of that type, but which seeks to do so by means quite different from cam-type control mechanisms. Each article-transfer or push-off unit of each station is driven by a pneumatic motor. The flow of pressurized air to the pneumatic motors is controlled by plural control valves which, in turn, are controlled by a computer, in a quite sophisticated way. The timing of the activation of the individual push-off units can be individually selected, i.e., each independent of the others, within certain limited time intervals and can be adjusted during operation of the multi-station machine by means of operator controls provided at a control panel. The system of that patent aims to provide extremely comprehensive control of the operations occurring, not only with respect to their timing, but with respect to their speeds, and other parameters, and is of very sophisticated, which is to say rather complex, character, compared to the cam-control systems more familiar to persons skilled in the art.

SUMMARY OF THE INVENTION

It is a general object of the invention to provide a multi-station machine, particularly a multi-station glass-forming machine, with a control system for the article-transfer units of the machine such that the article-transfer units can readily be adjusted to equalize as much as possible the spacing of articles transported away on the common outfeed conveyor. Furthermore, this is to be achieved using a system of relatively simple construction and operation.

In the preferred embodiment of the invention, the swinging motion of the cylinder of each push-off unit about a vertical swing axis is generated by a separate respective electric motor. The rotation of the electric motor of each individual push-off unit can be controlled independently of the electric motors of the other push-off units during operation of the machine. The control can be open-loop or closed-loop control, or a hybrid of both. By controlling the rotation of one or more of the plural electric motors, it becomes possible to very exactly adjust the moment in time at which the associated push-off unit(s) transfer their glass articles onto the common outfeed conveyor. By varying this moment in time, the relative spacing as among glass articles transferred onto the common conveyor from neighboring stations of the machine can be adjusted. Thus, during operation of the machine, the operator need only observe the relative spacing between successive articles on the conveyor belt. If he notes non-identical article spacing, he can readily ascertain which stations are responsible for the non-identical spacing. The operator can then adjust the rotation of the electric motors at the stations involved, until the spacing of the articles on the belt is again uniform. Certainly, it is not necessary to interrupt production merely to perform this adjustment. On the contrary, the operator can adjust as often as he wishes until he is completely satisfied with the uniformity of article spacing, and all during normal machine operation.

Preferably, the article-transfer units of the plural stations are controlled in dependence upon the rotation of a main control shaft. However the open-loop and/or closed-loop control of the individual electric motors of the article-transfer units is performed in dependence upon a relatively simple common or shared electronic control system for all units.

The motors provided are electric motors, but to avoid repetition they will hereafter simply be referred to as "motors".

Each push-off unit has as many fingers as there are glass articles to be simultaneously transferred from the respective station of the machine onto the common outfeed belt. If each station produces two glass articles at a time, then each push-off arm has two fingers.

In the preferred embodiment of the invention, the output shaft of each motor drives a crank, to which is connected a coupling rod, which in turn is coupled to a rocker coupled to the swing shaft of the fluid cylinder of the push-off unit. By appropriately selecting the relative lengths of the crank, the coupling rod and the rocker, it is quite easy to establish optimum velocity-versus-time profiles for the respective push-off units, relative to the travel of the outfeed conveyor, which latter is conventionally synchronized with machine operation anyway.

According to one feature of the invention, the rocker is coupled to the vertical swing shaft of the cylinder through the intermediary of an overload coupling. This protects the push-off unit from damage, if an obstacle is encountered preventing normal push-off unit motion.

In the preferred embodiment of the invention, the plural electric motors are controlled by a system comprising a common control logic unit. The control logic unit receives, at one input thereof, a series of timing signals during one cycle of machine operation and, at another input, a machine-cycle signal once per cycle of machine operation. The machine-cycle signal serves to reset the control logic unit. The control logic unit has plural outputs, each producing, but in sequence, a start signal for the push-off unit of a respective station. Each start signal is applied to the input of a respective command-signal-processing unit. The plural command-signal-processing units each receive their respective start signals through the intermediary of a respective adjustable time-delay stage. The output of each time-delay stage is connected to the control input of a respective analog switch. The signal inputs of all the analog switches receive a common or shared desired-rpm voltage, i.e., a desired-rpm signal generated for all the motors. The output of each analog switch is connected to the input of the power amplifier for the respective electric motor. The time-delayed transmission of the respective start signal causes the desired-rpm voltage to be applied to the power amplifier or control circuit for the respective motor, at the proper time.

The motors are preferably of steplessly controllable rpm, and preferably are permanent-magnet-stator D.C. gear motors. The motor (s) of these stations which may, at a given time, not be producing glass articles are not activated, whereas those of the article-producing or active stations are activated in sequence. The common desired-rpm voltage can, for example, be generated using an exteriorly accessible potentiometer and will preferably be proportional to the rpm which the motors are to assume when operating. The plural time-delay stages can be individually adjustable, for example by means of respective, exteriorly accessible potentiometers. In this way, the phase of activation of each individual motor can be very finely adjusted relative to the complete machine operating cycle.

According to a further concept of the invention, a main control shaft for the multi-station machine drives a timing or control disk shared by all stations, and the timing disk is provided with one timing element (e.g., an aperture) sensed by a stationary proximity detector which generates a machine-cycle signal, one per machine operating cycle, and the control disk is furthermore provided with additional timing elements sensed by another stationary proximity detector which generates intracycle timing signals used for sequencing the push-off units. The timing disk can be an apertured disk, and the apertures sensed by an opto-electronic transducer; can be provided with cam-like projections sensed by appropriate proximity detectors; or the like. If the total number of active stations of the multi-station machine is changed, e.g., if one station is taken out of operation, then the phase angles of push-off-unit activation, i.e., expressed relative to one complete cycle of machine operation, can be reestablished by, for example, removing the present control disk and replacing it with another provided with a number of timing elements equal to the number of active stations. The removal of a control disk and its replacement by another can be quickly and easily performed, particularly if the control disk is kept at a conveniently accessible location, without resulting in production losses.

According to another concept of the invention, the aformentioned main control shaft drives the aforementioned control disk through the intermediary of a phase-adjusting transmission. The phase-adjusting transmission allows to adjust the angular position of the control disk and thus the phase angles of all push-off units simultaneously by an equal amount relative to the main control shaft.

In the preferred embodiment of the invention, the common or shared control logic unit comprises an electronic counter which receives and counts the aforementioned timing signals and is reset by the aforementioned machine-cycle signals. The outputs of the counter are wired through so as to be accessible at all stations. Each station is provided with a selector switch comprising a set of stationary contacts electrically connected to respective ones of the outputs of the counter, and with a movable contact engageable with any selected one of the respective stationary contacts. The movable contact transmits the start signal for the respective station and is permanently connected to the input of the command-signal-processing unit of the respective station. Using such a set of selector switches, it becomes possible to select and establish the desired sequence of push-off unit activation in a way which is easy to perform and easy to understand for the operator. The operator sets each selector switch to the setting corresponding to the place of the respective station in the machine operating cycle, i.e., corresponding to the sequence in which glass gobs are fed to successive ones of the stations for article-formation.

According to a further concept of the invention, each selector switch furthermore has an additional zero-setting stationary contact which, when engaged by the moving contact of the selector switch, prevents the transmission of start signals to the motor-control circuitry of the respective station, so that the push-off unit of that station will not be activated at all. For example, if the glass-forming machine has ten stations, of which two are to be kept inactive for a particular run, then the selector switches of those two stations are each set to the zero-setting. The associated push-ff units are then not activated at all, which among other things prevents unnecessary wear upon them. Also, as already stated, in the preferred embodiment this would furthermore require replacement of one control disk with another.

In one embodiment of the invention, plural flip-flops are provided. The set input of each is connected to the output of a respective time-delay stage, the output corresponding to the set input is connected to the control input of the respective analog switch. The reset input of the flip-flop receives a signal from a proximity detector which senses an end position of the crank driven by the respective motor. This makes for particularly simple inplementation of motor shut-off upon performance of an article-transfer operation. The proximity detector can for example be a limit switch which responds directly to the crank driven by the respective motor.

In a somewhat more sophisticated embodiment, the common desired-rpm signal is not merely amplified by the power amplifier, but instead constitutes the command signal for a negative-feedback rpm-control circuit. Each motor is provided with a respective tachometer, or the like, generating an actual-rpm signal, and the difference between the desired-rpm and actual-rpm signals determines the magnitude of the power supply to the respective motor. For example, the actual-rpm signal can be applied to the gain-control input of the motor's power amplifier.

In another embodiment, the negative-feedback motor control circuit just mentioned is supplemented by an angular-position detector coupled to the output shaft of the respective motor and the negative-feedback control of motor power supply is performed in additional dependence upon angular position. Angular-position feedback can be used, when it is desired to establish very reliable reference positions, or the like, for the push-off unit driven by the motor.

According to another concept of the invention, there is generated, besides the desired-rpm signal, a common or shared low-desired-rpm signal. The command-signal-processing unit of each station additionally includes a further analog switch which when conductive transmits the low-desired-rpm signal to the motor-energization stage of the respective motor. The latter initially receives the desired-rpm signal and then the low-desired-rpm signal, the changeover occurring when the respective push-off unit has reached a predetermined position. As a result, the motor rpm is lowered down to a predetermined constant value before actually cutting off the motor power supply, thereby assuring that any coasting action which may follow motor shut-off is of a precisely repeated character, i.e., so that it can be taken into account.

According to a further concept of the invention, the plural time-delay stages each have a further input, to which can be simultaneously applied a manual start signal. A manual start signal is applied to all time-delay stages simultaneously before actually commencing machine operation, and as a result the plural push-off units perform a complete article-transfer operation all in unison, i.e., not sequentially. This makes it possible to directly compare the operation of each push-off unit relative to the others, e.g., to see if one push-off unit is performing differently from the others. The control switches for this simultaneous manual start and for normal automatic operation should be interlocked, so as to be able to select only one or the other of these two modes of operation. The manual start signal can be furnished on a manual-start-signal line common to all the time-delay stages and containing a manual start switch, with the start signal per se being derived from the machine-cycle signal or from a separate pulse generator.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
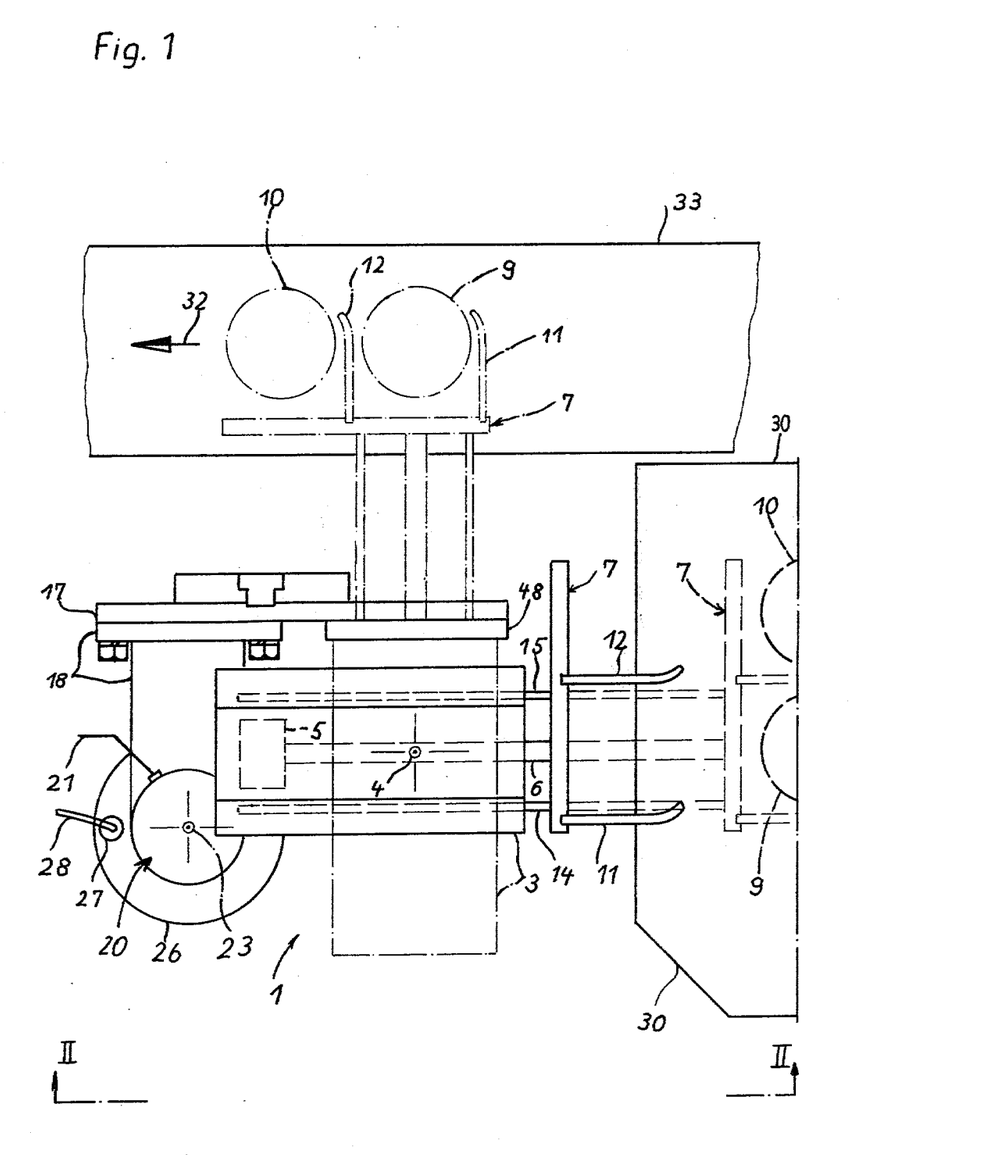
FIG. 1 is a top view, looking down upon the push-off unit at one station of a multi-station glass-forming machine.

FIG. 1 is a top view looking down upon the push-off unit 1 provided at one station of a multi-station glass-forming machine. Push-off unit 1 includes a fluid-actuated piston-and-cylinder unit 3, 5 mounted for swinging movement about a vertical swing axis 4. The piston 5 carries on its piston rod 6 a push-off arm 7 provided with two fingers 11, 12, namely one for each of the glass articles 9, 10 to be pushed off. The cylinder 3 is provided with guide rods 14, 15 to assure that the push-off arm 7 cannot rotate about its own longitudinal axis.

The swinging of piston-and-cylinder unit 3, 5 about its vertical axis 4 is performed by a motor 20 mounted on the base plate 17 by a housing 18. Motor 20 is of continuously (steplessly) adjustable rpm, and is preferably a permanent-magnet-stator D.C. gear motor having a power-supply line 21. Numeral 23 denotes the longitudinal axis of the motor drive shaft 24, the latter being actually depicted in FIG. 2. Housing 18 mounts a carrier plate 26 for a contactless limit switch 27 to which is connected a signal line 28.

Figure 5:
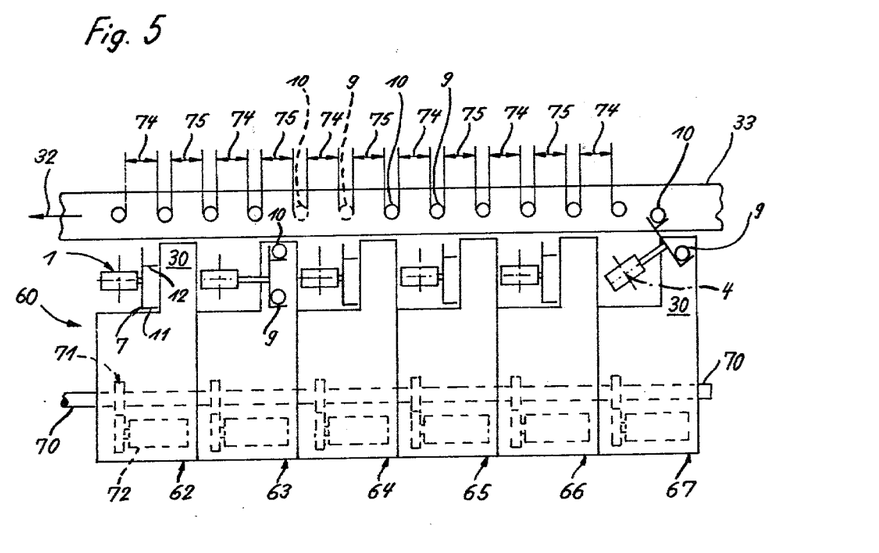
FIG. 5 is a schematic top view, looking down upon the plural stations and respective push-off units of the multi-station glass-forming machine.

FIG. 5 depicts the series of such stations in the multi-station glass-forming machine. Here, by way of example, the machine operates in the so-called double-gob mode, i.e., each individual station producing two glass articles 9, 10 at a time. The finished glass articles 9 and 10 are deposited, by a mechanism in the respective station, onto a deposit plate 30 at such station, at the positions shown as broken circles in FIG. 1. Then, referring to FIG. 1, pressurized fluid is fed to the left work chamber of the piston-and-cylinder unit 3, 5 as a result of which the push-off arm 7 moves from the solid-line rest position of FIG. 1 to the broken-line work position, the fingers 11, 12 of the push-off arm 7 entering behind the respective glass articles 9, 10. Then, in a manner described further below, the respective motor 20 is activated via the power-supply line 21 and starts, swinging the piston-and-cylinder unit 3, 5 counterclockwise (as viewed in FIG. 1), taking the glass articles 9, 10 with it, into the dash-dot-line position in FIG. 1, in which the glass articles 9, 10 are transferred onto a common conveyor belt 33 which travels in the direction of arrow 32.

Then, the other work chamber of piston-and-cylinder unit 3, 5 is activated by pressurized fluid, as a result of which the push-off arm 7 longitudinally retracts back towards the cylinder 3. As soon as the fingers 11, 12 have retracted back out of the engagement range of glass articles 9, 10, the motor 20 now swings the piston-and-cylinder unit 3, 5 about the vertical swing axis 4 back to the solid-line starting position shown in FIG. 1. The push-off cycle can then be initiated anew.

Figure 2:
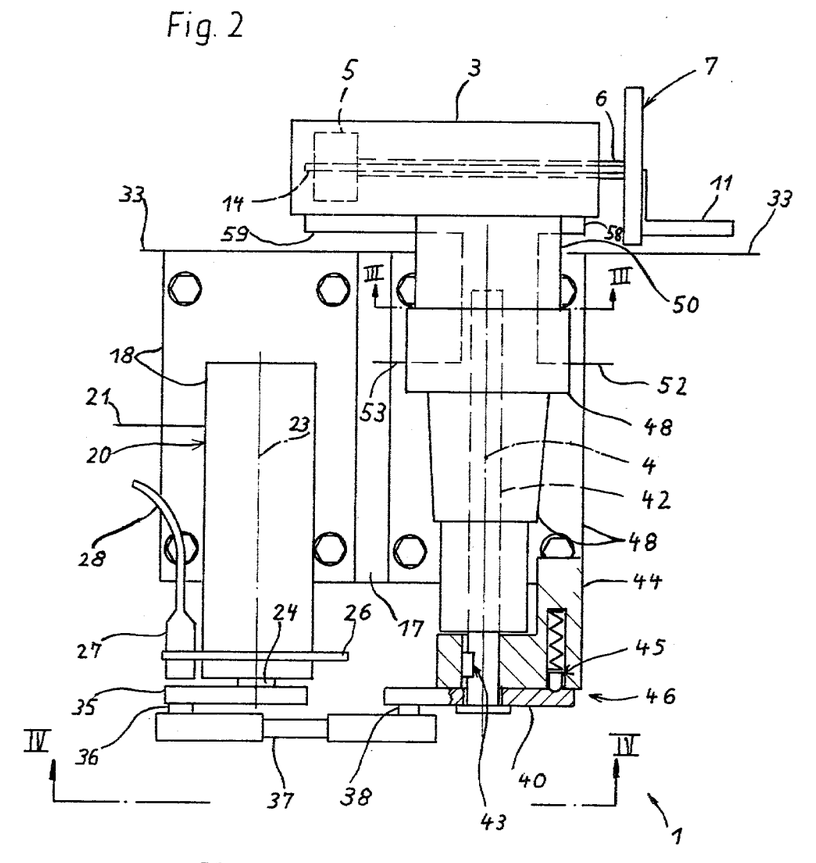
FIG. 2 is a view of the push-off unit of FIG. 1, taken looking in the direction of arrows II—II in FIG. 1, partly in section.

As shown in FIG. 2, there is secured to the output shaft 24 of motor 20 a crank 35, to whose crank pin 36 there is pivotally linked a connecting rod 37, the other end of which is pivotally coupled to a pin 38 on a rocker 40.

The contactless limit switch 27 is activated by the proximity of the crank 35.

Rocker 40 is loosely mounted on a shaft 42, the longitudinal axis of which constitutes the aforementioned vertical swing axis 4. Also mounted on shaft 42 is a follower 44, coupled to the rocker 40 by means of a spring-and-groove connection at 43. The follower 44 is provided with a spring-biased snap-action detent 45 which engages a recess in rocker 40, so as to cause follower 44 to share the swinging motion of rocker 40. At the same time, this structure constitutes an overload coupling 46. If, for example, the push-off arm 7 encounters sizable resistance to horizontal swinging movement, the overload coupling 46 decouples, so that the swing force supplied by motor 20 is not transmitted via follower 44 to the piston-and-cylinder unit 3, 5; this serves to prevent damage to the push-off unit.

Shaft 42 is rotatably journalled in a housing 48 secured to the base plate 17. The upper end of shaft 42, as shown in FIG. 2, has secured to it a rotary valve member 50, which in turn is secured to the cylinder 3.

Figure 3:
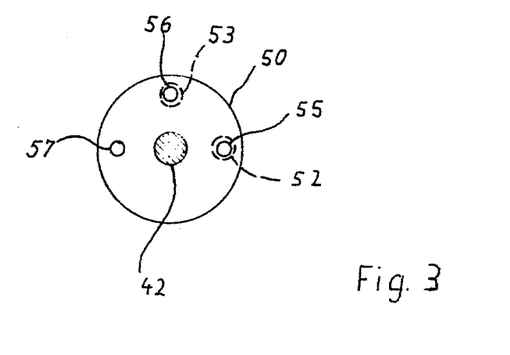
FIG. 3 is a section taken along line III—III in FIG. 2.

As shown in FIG. 3, the housing 48 is provided with pressurized-fluid conduits 52, 53, located offset relative to each other by 90° in the circumferential direction of shaft 42. The rotary valve member 50 has ports 55, 56, 57 spaced apart from each other by 90°. Valve member 50 alternatively assumes a first position, in which it supplies pressurized fluid to one of the two pressurized-fluid conduits 58, 59 and thereby to one of the two work chambers of the piston-and-cylinder unit 3, 5, and a second position in which it supplies pressurized fluid to the other work chamber, the work chamber not thusly supplied being connected to a return-flow conduit or to atmospheric pressure.

Figure 4:
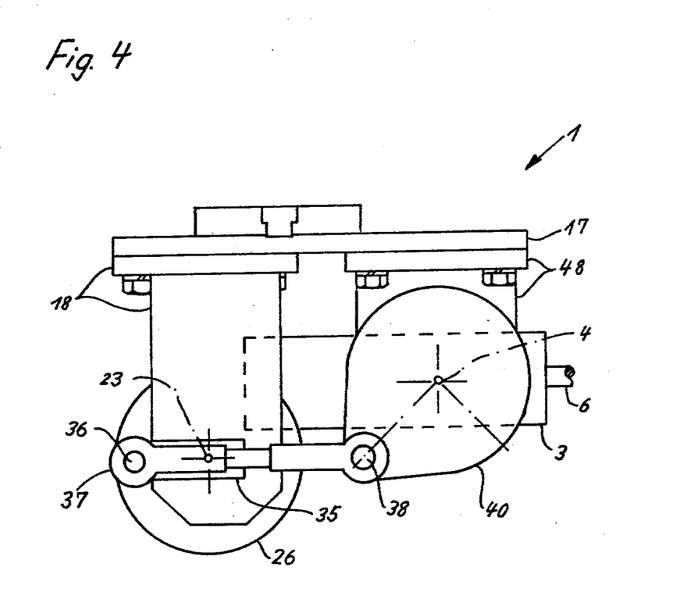
FIG. 4 is a view of the push-off unit, looking in the direction of arrows IV—IV of FIG. 2.

FIG. 4 depicts the push-off unit 1 as seen from below.

In FIG. 5, the conveyor belt 33 is shown running along the six stations 62-67 of the multi-station machine 60. Each station 62-67 is provided with a respective push-off unit 1 such as described above. A main control shaft 70 extends along all the stations 62-67 of the machine 60. Each station is provided with a respective transmission 71, through which the main control shaft 70 drives a respective control drum 72, the latter in itself being of conventional design and serving in the ordinary way to control in proper sequence and with proper timing individual operations which are to be performed at the respective station of the machine.

The spacing between the two fingers 11, 12 of each individual push-off arm 7 is the same for all the push-off arms, is constant, and results in equal distances 74 as between the two glass articles 9, 10 pushed off onto conveyor belt 33 from each individual station. In contrast, the distance 75 between adjoining pairs of glass articles 9, 10, coming as they do from adjoining stations, depends upon the timing and speeds of operation of the push-off units of the plural stations. It is a main purpose of the present invention to provide a simple way for making all distances 75 equal to the distance 74, and keeping those distances constant.

As shown in FIG. 5, at station 63 the push-off arm 7 has just entered with its fingers 11, 12 behind the two glass articles 9, 10 to be removed from that station; these two articles 9, 10 will be transferred onto conveyor belt 33 at the locations shown as broken-line circles in FIG. 5 and provided with broken lead lines from numerals 9, 10. At station 67, the push-off unit 1 has begun to swing about its vertical swing axis 4 and the respective two glass articles 9, 10 are being transferred onto the conveyor belt 33.

Figure 6:
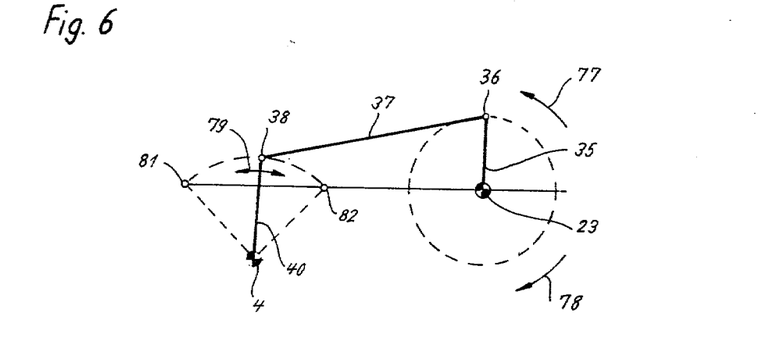
FIG. 6 diagrammatically represents the movements performed by components of the push-off unit as viewed in FIG. 4.

FIG. 6 schematically depicts the relationship between the rotation of the motor output shaft 24 about axis 23, on the one hand, and the swinging motion of cylinder 3 about the vertical swing axis 4, on the other hand. During a push-off cycle of duration T (FIG. 8), the crank 35 performs one complete rotation either counterclockwise in the direction of arrow 77 or else clockwise in the direction of arrow 78. In either case, the rocker 40 swings, as indicated by the double-headed arrow 79, first through 90° in one direction and then through 90° in the opposite direction. FIG. 6 depicts the rocker 40 in its middle setting, intermediate the two end points 81, 82 of the path of movement of the rocker's pin 38.

Figure 7:
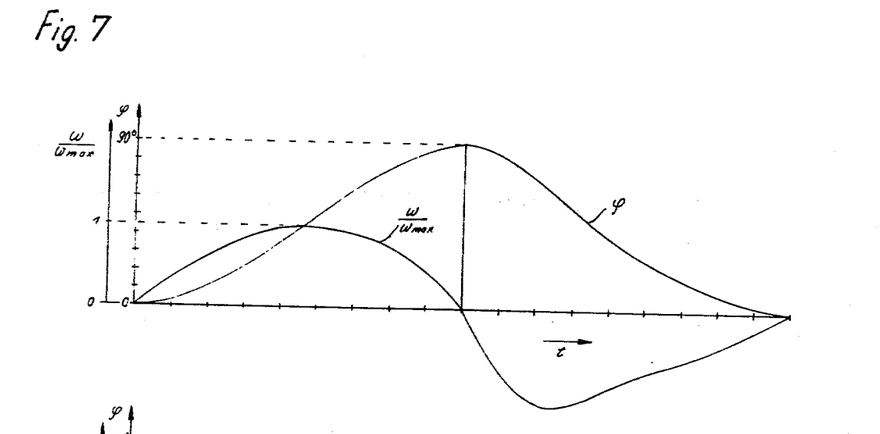
FIGS. 7 and 8 are angular-speed-versus-time and angular-position-versus-time graphs for the motions diagrammed in FIG. 6.
Figure 8:
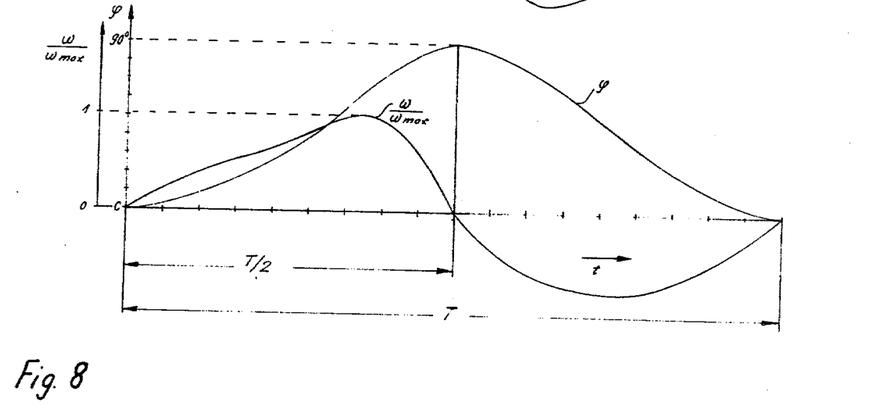

FIGS. 7 and 8 are plots, with respect to time t, of the angular position $\phi$ of the rocker 40, and also of the normalized angular frequency $\omega/\omega_{max}$ thereof. FIG. 7 depicts the variation in angular position and angular speed as a function of time, when crank 35 turns in the direction of arrow 77, and FIG. 8 when crank 35 turns in the direction of arrow 78. The rotation in the direction of arrow 77 shown in FIG. 7 is particularly well suited for slow operation of the push-off unit 1. In contrast, the rotation of crank 35 in the direction of arrow 78 shown in FIG. 8 is well suited for high-speed operation of the push-off unit 1. In the latter case, the relatively slow rise in angular velocity is desirable. In this way, the velocity reached by push-off arm 7 at the end of the actual push-off movement (at T/2 in FIG. 8), is better made to equal the transport speed of conveyor belt 33. However, from the practical viewpoint, when transferring glass articles onto the conveyor belt, the velocity of push-off arm 7 upon completion of the push-off motion will be somewhat greater than that of the conveyor belt 33, in order to assure that the distance 74 between the two glass articles 9, 10 stays constant.

Figure 9:
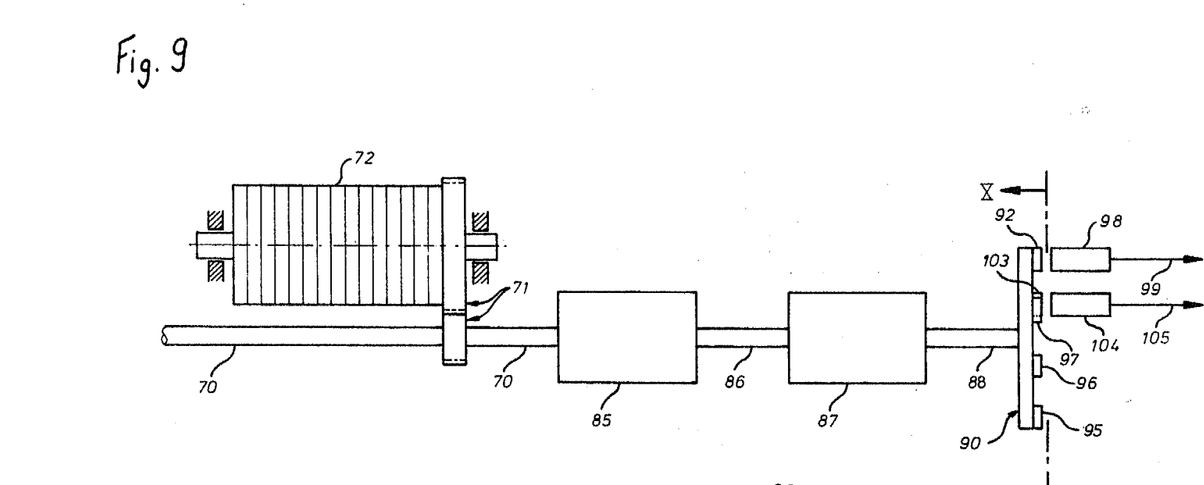
FIG. 9 schematically depicts the drive mechanism for the control or timing disk of the control system for the push-off units.
Figure 10:
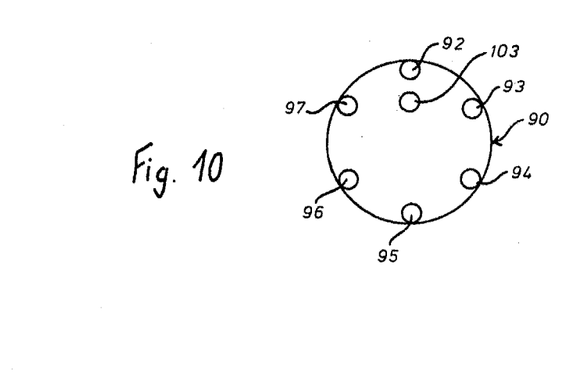
FIG. 10 is a view looking along line X—X of FIG. 9.

In FIG. 9, the main drive shaft 70 of the machine 60 is shown extending beyond the control drum 72 of the last station and driving a compensating transmission 85. The transmission 85 has a transmission ratio such that its output shaft 86 turns at an angular velocity identical to the velocity of each one of the plural control drums 72. The shaft 86, in turn, drives a phase-adjusting transmission 87 having an output shaft 88. Phase-adjusting transmission 87 assures that the rotating shaft 88 will be in proper phase with the control drums 72. Secured to shaft 88 is one control disk 90, shared in common by all the individual stations of the machine. As shown in FIG. 10, the control disk 90 is provided near its periphery with six switch-actuating projections 92–97, one for each respective one of the stations 62–67. During the performance of one complete machine cycle, the switch-actuating projections 92–97 successively move past a contactless proximity detector 98, which supplies timing signals via a line 99 to a control logic unit 100 (FIG. 11) of a motor-control circuit 101. The movement of each successive one of the switch-actuating projections 92–97 past the proximity detector 98 results in the generation of a respective timing signal on line 99.

The control disk 90 is further provided with a switch-actuating projection 103 which cooperates with a contactless proximity detector 104. During the performance of one machine cycle, the proximity detector 104 issues on line 105 one machine-cycle signal which is transmitted to the control logic unit 100.

Figure 11:
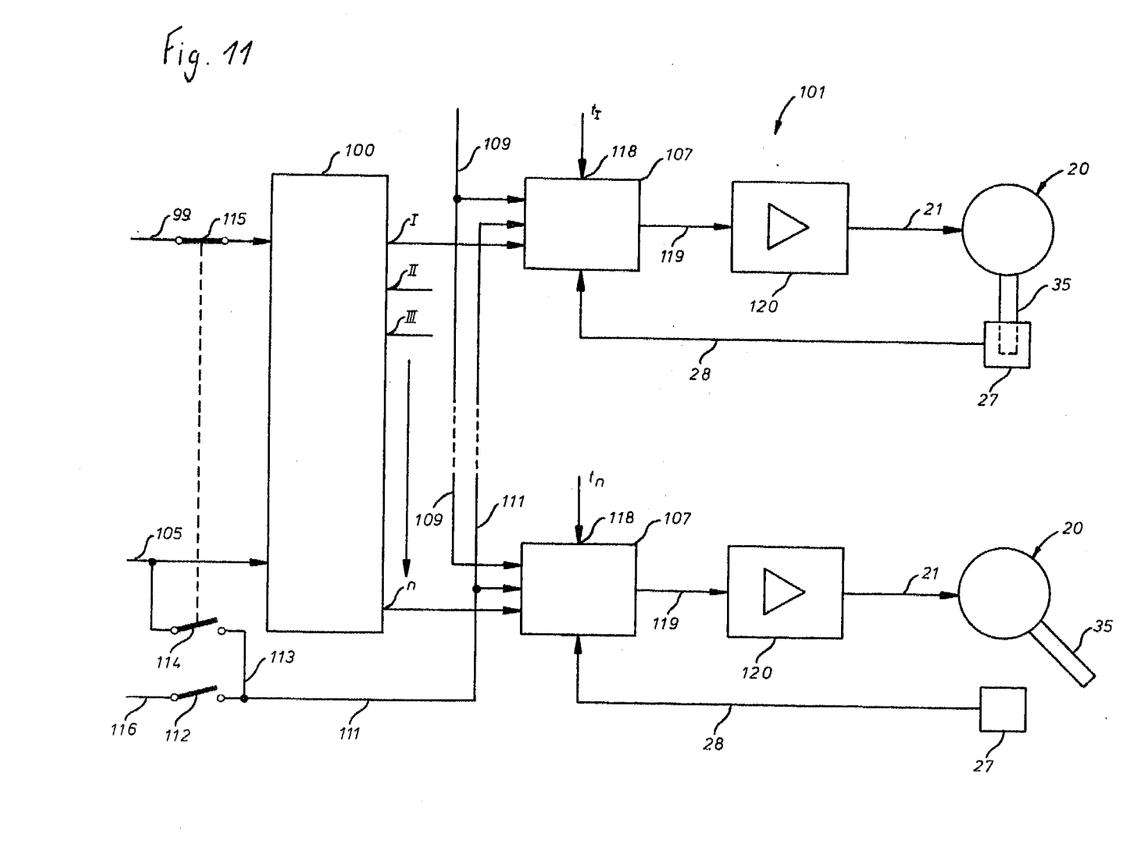
FIG. 11 is a simplified schematic depiction of the electronic control system for the motors of the plural push-off units.

As shown in FIG. 1, the common control logic unit 100 has plural outputs I, II, III, ..., n, each associated with a respective one of the plural stations, e.g., 62–67. Each control-logic output is connected to one input of a respective command-signal-processing unit 107. A further input of each unit 107 is connected to a common line 109, to which is applied a desired-rpm voltage directly proportional to the rpm desired for the motors 20. By adjusting the value of the desired-rpm voltage, the duration of the push-off operation performed by the push-off units 1 can be varied. This is important, because different glass articles 9, 10, e.g., of different size and/or design, may under certain circumstances require push-off operations of different duration, if the push-off operation is to be optimally performed. This can be taken into account by changing the desired-rpm voltage on common line 109.

A further input of each command-signal-processing unit 107 is connected to a common manual-start-signal line 111 connected to a manual start switch 112. The manual-start-signal line 111 is connected via a line 113 containing a further manual switch 114 to the line 105 for the machine-cycle signal. The manual switch 114 is coupled with the switch 115 in the line 99 for timing signals. The manual-start-signal line 111 assures that all motors 20 are caused to operate at identical phase prior to commencement of actual machine operation. To this end, as a first possibility, with the manual switch 114 open the manual switch 112 can be closed, as a result of which a start signal is transmitted via a line 116 to all the command-signal-processing units 107 simultaneously. Alternatively, the manual switch 112 can be left open and the manual switch 114 can be closed. If manual switch 114 is closed, then simultaneously switch 115 opens, so that timing signals can no longer be applied to the control logic unit 100 and from there to the command-signal-processing units 107. Instead, the machine-cycle signal appearing on line 105 is transmitted, via the closed switch 114, the line 113 and the manual-start-signal line 111, to all the command-signal-processing units 107, serving a common start signal therefor.

Each command-signal-processing unit 107 has a further input 118, at which it receives a respective desired-time-delay signal $t_I$ to $t_n$, for purposes explained below. Each command-signal-processing unit 107 is connected via a respective line 119 to a respective power amplifier 120, the output of which is connected to the power-supply line 21 of the respective one of motors 20.

Figure 12:
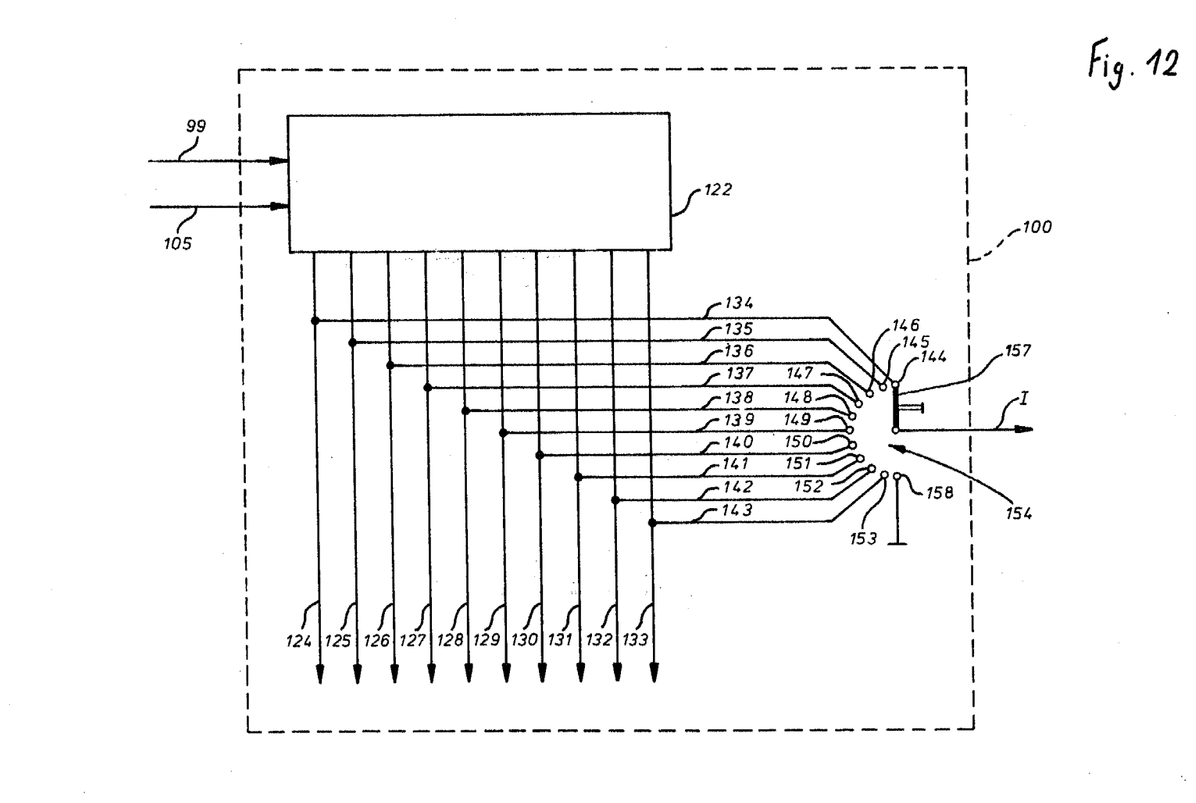
FIG. 12 depicts the internal configuration of the control logic unit 100 of FIG. 11.

FIG. 12 depicts the internal configuration of the control logic unit 100. The timing-signal line 99 and the machine-signal line 105 are connected to inputs of an electronic counter 122. Counter 122 has a set of outputs 124–133 on which the counts achieved by counter 122 are indicated by signals. As shown in FIG. 12 for the first station of the machine, the I output of control logic 100 is connected to the rotary contact 157 of a selector switch 154. Rotary contact 157 can be manually turned to engage any selected one of stationary contacts 144–153. The latter contacts are connected, by respective branch-off lines 134–143, to respective ones of the counter output lines 124–133. For each output I, II, III, ..., n of the control logic unit 100, a similar selector switch 154 and associated branch-off lines are provided. The operator sets each selector switch 154 to a setting corresponding to the place in sequence which the associated station of the machine is to take. For example, the timing signals applied to counter 122 via line 99, and produced by proximity detector 98 each time the latter is passed by a switch-actuating projection 92–97 (FIG. 10), can advance the signal at the output of counter 122 from line 124 to line 133 in sequence, i.e., as a one-out-of-n counting operation. Because the rotary contact 157 associated with the I output of control logic 100 is engaged with first stationary contact 144, the I output is the first to produce a start signal, and accordingly the push-off unit 1 associated therewith is the first to receive a start signal. The rotary contact associated with the II output of control logic 100 could, for example, be engaged with second stationary contact 145, and so the associated push-off unit 1 would be the second to receive a start signal, i.e., during the course of a complete machine cycle. The machine-cycle signal applied to counter 122 via line 105 can, for example, be used to reset the counter 122 once per complete machine cycle.

Each selector switch 154 furthermore comprises a grounded stationary contact 158, providing a zero-setting, to which rotary contact 157 is set when the associated push-off unit 1 is not to operate, i.e, because the associated station of the machine is not in operation.

Figure 13:
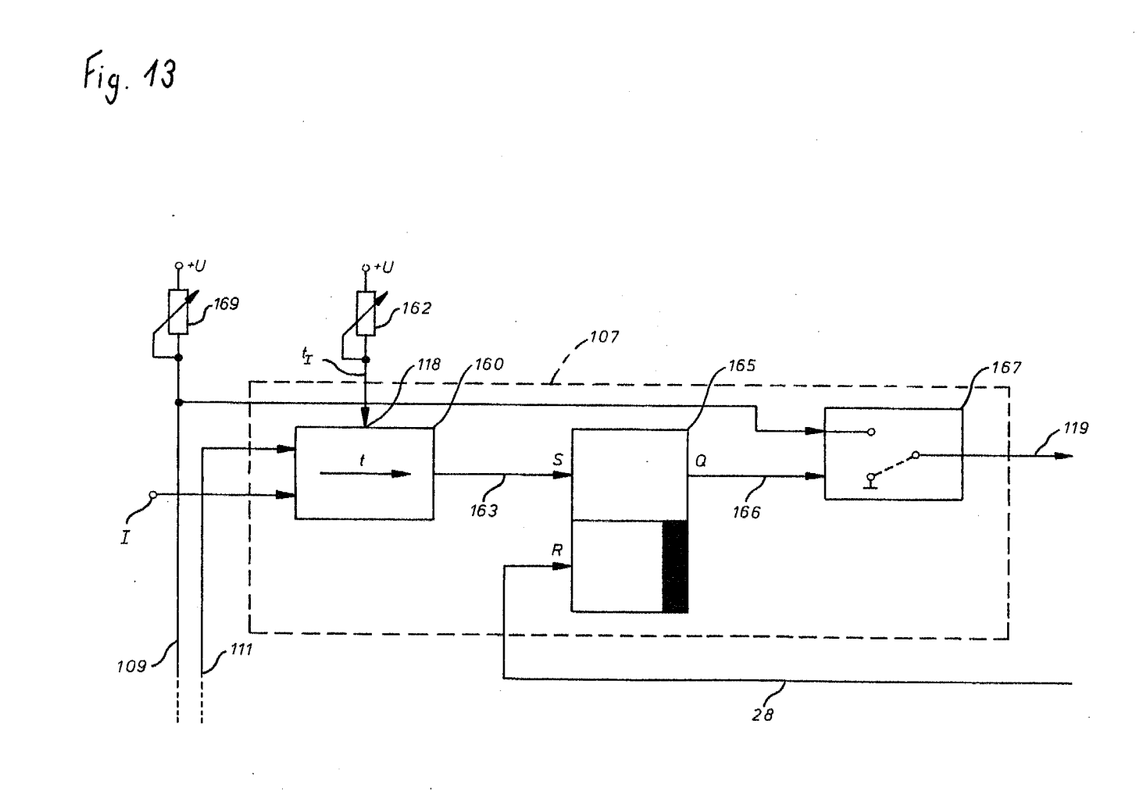
FIG. 13 depicts the internal configuration of the command-signal-processing unit 107 of FIG. 11.

All the command-signal-processing units 107 are of the same internal configuration, shown in FIG. 13 for one of them. The associated control-logic output, here output I, and also the manual-start-signal line 111, are both connected to the input of an adjustable time-delay stage 160. Input 118 of stage 160 receives the desired-time-delay signal $t_f$ via a potentiometer 162 used to select the desired time delay. The output of time-delay stage 160 is connected via a line 163 to the set input S of a flip-flop 165, whose reset input R is connected to the line 28 from limit switch 27. As soon as the limit switch 27 is activated by the crank 35, a reset signal is applied via line 28 to flip-flop 165, the output Q of which is connected via a line 166 to the control input of an electronic analog switch 167. The signal input of analog switch 167 is connected with the desired-rpm-voltage line 109. The magnitude of the desired-rpm-voltage on line 109 is selected by means of an accessible potentiometer 169.

The output of analog switch 167 is connected via a line 119 to the power amplifier 120 for the respective motor 20.

By using the potentiometer 162 to adjust the desired-time-delay voltage applied to the time-delay control input of stage 160, one is able to adjust the delay which occurs between, on the one hand, the appearance of a start signal on control-logic output I, and, on the other hand, the actual application of a start signal to the control input of analog switch 167, and thereby the exact moment at which the associated motor 20 will begin to operate. The speed at which motor 20 will operate after being started is determined by the desired-rpm-signal from common potentiometer 169. In this way, the respective phase shifts in the operation of the plural motors 20 can be adjusted relative to each other in such a way that the distances between neighboring glass-article pairs 9, 10 will be equal and constant after the adjustment. When the crank 35 activates limit switch 28, flip-flop 165 then resets, and analog switch 167 no longer transmits to the motor power amplifier 120 the desired-rpm voltage from potentiometer 169.

Figure 14:
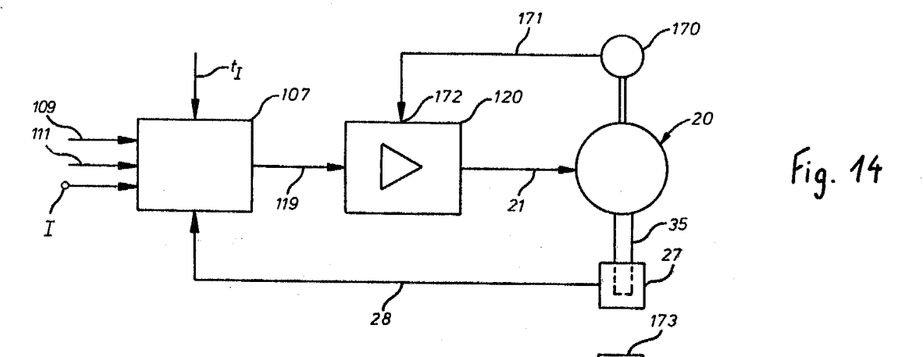
FIGS. 14-16 depict three different modifications of the system shown in FIG. 11.

FIG. 14 depicts a modification of the foregoing, to the extent that the motor 20 additionally drives a tachometer generator 170 which generates an actual-rpm feedback signal furnished via a line 171 to the feedback input of the motor-control circuit 101, here to the gain-control input 172 of the power amplifier 120. Accordingly, in FIG. 14, the desired-rpm-signal on line 109 is not merely amplified by the power amplifier but used as a command signal in a negative-feedback rpm-control loop. As a result, the rpm commanded by the signal on line 109 is quickly achieved and then reliably maintained constant.

Figure 15:
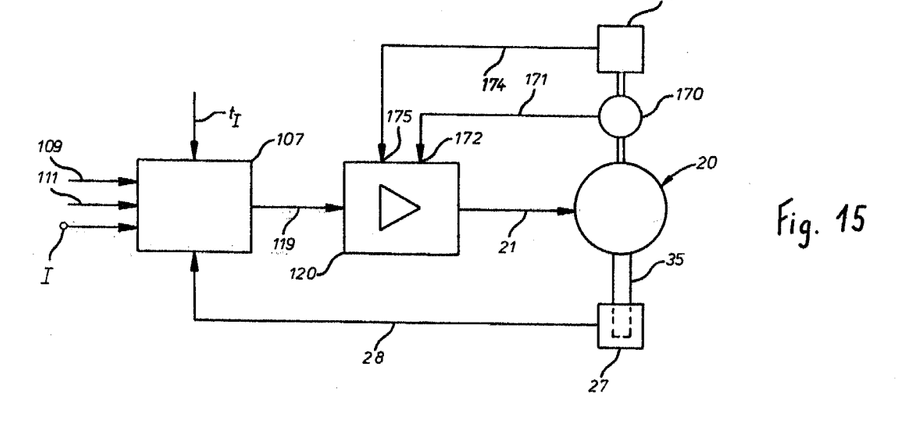

The motor-control circuit shown in FIG. 15 differs from that of FIG. 14 by inclusion of position-dependent action in the motor-control feedback loop. A rotary-position transducer 73 driven by motor 20 generates an angular-position signal which is fed back via a line 174 to the feedback input 175 of the power amplifier 120, to automatically modify motor operation in dependence upon angular position, if desired. The rotary-position transducer 173 can be coupled to the crank 35 and sense the angular position of the latter, in order to achieve negative-feedback control in dependence upon the position of the crank 35.

Figures 16, 17:
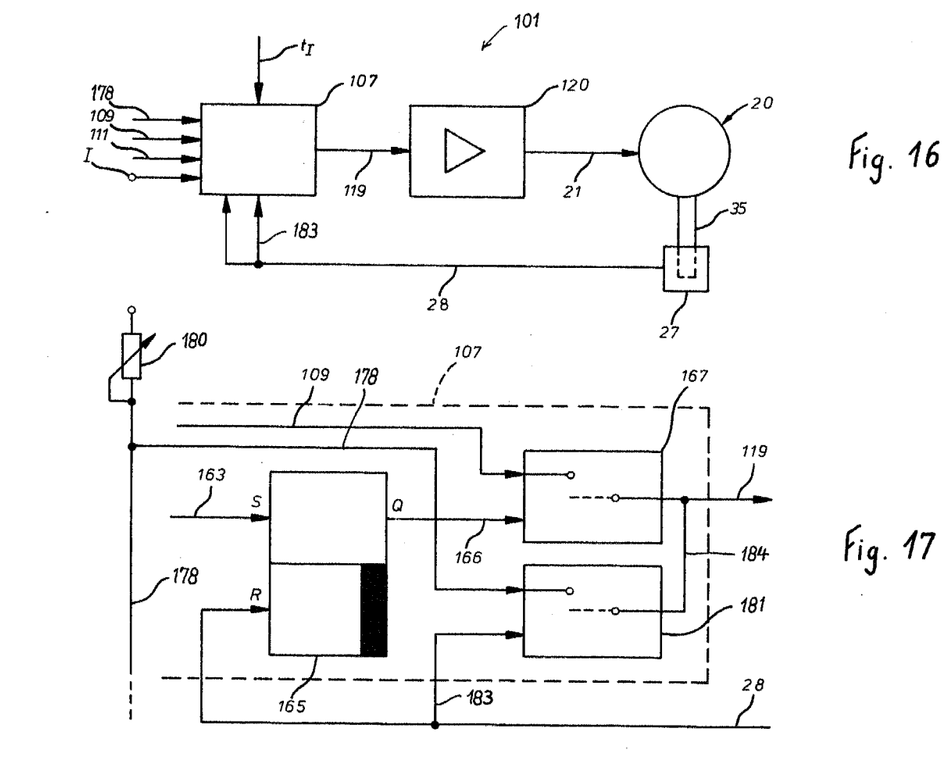
FIG. 17 depicts the internal configuration of the command-signal-processing unit 107 of the embodiment shown in FIG. 16.

FIG. 16 is a very simplified depiction of a further motor-control circuit 101. A low-desired-rpm signal is applied via a line 178 to a further input of the command-signal-processing unit 107, commanding an rpm lower than that commanded by the signal on line 109. Prior to cutting off the motor power supply, a switchover occurs from the desired-rpm signal on line 109 to the low-desired-rpm signal on line 178, as a result of which the motor 20 will be operating at very low speed when its power supply is interrupted by limit switch 27, thereby increasing the reliability of the particular angular position of crank 35 at the moment when the motor is switched off and the crank 35 ceases to move.

The FIG. 16 motor-control circuit is depicted in detail in FIG. 17. An accessible potentiometer 180 is used to select the low-desired-rpm voltage, which is then applied to the units 107 of all stations via the common line 178. Within each unit 107, the low-desired-rpm signal line 178 is connected to the signal input of an electronic analog switch 181. The limit-switch signal line 28 is connected to the reset input of flip-flop 165 as before, but furthermore has a branch-off line 183 connected to the control input of the analog switch 181. The output of analog switch 181 is connected through a line 184 onto the output 119 of unit 107, which leads to the power amplifier 120 for the respective motor 20.

The crank 35 has a finite breadth. When it nears contactless limit switch 27, i.e., which acts as a proximity detector, switch 27 produces a signal of finite duration which then terminates as crank 35 leaves limit switch 27. This finite-duration signal is applied via line 28 to the reset input R of flip-flop 165, as a result of which analog switch 167 ceases to transmit the desired-rpm voltage on line 109. Simultaneously, the limit-switch signal on line 28 is applied to the control input of analog switch 181, as a result of which the low-desired-rpm signal on line 178 is transmitted to output line 119. The speed of the motor now decreases very markedly. Then when the crank 35 leaves limit switch 27, the signal on line 28 terminates, the analog switch 181 ceases to transmit the low-desired-rpm signal as well, and the respective motor 20 ceases to be energized. Because the low speed commanded by the signal on line 178 is constant, and because the motor 20 is turning at this low rpm at the instant when its power supply ceases, any coasting motion which crank 35 may perform subsequent to cutting off the motor power supply is small and of constant magnitude, so that by selecting the position of limit switch 27 virtually any desired end position for crank 35 can be established.

The motor-control circuits 101 described above can be readily implemented by combining commercially available circuit modules which, when necessary, can be individually removed and replaced by new ones very readily.

It will be understood that each of the elements described above, or two or more together, may also find a useful application in other types of constructions and circuitry differing from the types described above.

While the invention has been illustrated and described as embodied in the context of control systems controlling the operation of push-off units which transfer glass articles onto the common outfeed conveyor of a multi-station glass-forming machine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a multi-station machine, particularly a glass-forming machine producing glass articles, of the type in which each station of the machine deposits articles produced at that station onto a respective deposit location, an article transfer system comprising a common conveyor extending along the stations of the multi-station machine and serving to carry away articles produced at the stations; plural article transfer means each operative when activated for engaging at least one article at the deposit location of a respective station, performing a transfer motion transferring such article or articles onto the e common conveyor, and then performing a return motion returning to starting position for another such article transfer; a plurality of rotary electric motors each coupled in driving connection to the article transfer means of a respective one of the stations and each supplying motion to the respective article transfer means for causing the same to perform the transfer and return motions; and control means connected to the rotary electric motors and operative for controlling the rotation of each motor individually independently of the rotation of the respective remaining motors.

2. The machine defined in claim 1, each transfer means comprising a cylinder and piston unit, the cylinder being mounted on a vertical swing shaft for swinging movement about a vertical swing axis, a push-off arm coupled to the piston for movement between a retracted position not engaging articles and an extended position engaging articles, the article transfer motion being an extension of the push-off arm and a swinging movement of the cylinder towards the conveyor belt, the return motion being a retraction of the push-off arm and a swinging movement of the cylinder back towards the respective deposit location.

3. The machine defined in claim 2, each transfer means furthermore comprising a crank driven by the respective motor, a rocker coupled to the respective swing shaft, and a coupling rod coupled to and driven by the crank and coupled to and driving the rocker.

4. The machine defined in claim 1, the control means comprising means activating the plural electric motors in a predetermined cyclical sequence, in order to cause the plural article transfer means to be activated in sequence.

5. The machine defined in claim 4, the control means furthermore comprising selecting means generating a common desired-rpm signal for all the motors and sequencing means activating the motors in a predetermined sequence and in accordance with the common desired-rpm signal so that each motor when activated rotates at the selected rpm.

6. The machine defined in claim 5, the control means including multi-setting sequence-selecting means settable by the operator for selecting the sequence in which the motors are to be activated.

7. The machine defined in claim 6, the control means including means generating a machine-cycle signal and intracycle timing signals in synchronism with machine operation, a multi-output control logic unit each output of which is associated with a respective station, the control logic units producing a start signal at successive outputs in correspondence to the selected sequence and in response to the timing signals and being reset by the machine-cycle signal, a plurality of adjustable time-delay stages each connected to a respective output of the control logic unit, plural analog switches each having a control input connected to the output of a respective time-delay stage and a signal input connected to receive the desired-rpm signal, and plural motor-activating means each connected to the output of a respective analog switch and receiving therefrom the common desired-rpm signal and activating the respective motor in correspondence to the common desired-rpm signal.

8. The machine defined in claim 7, the means generating the machine-cycle and timing signals comprising a main control shaft rotating in synchronism with machine operation, a control disk driven by the control shaft and provided with angularly spaced timing-signal and machine-cycle-signal elements, and stationary transducers sensing the timing-signal and machine-cycle-signal elements and producing the timing and machine-cycle signals.

9. The machine defined in claim 8, furthermore including a phase-adjusting means connecting the control disk to the main control shaft.

10. The machine defined in claim 7, the control logic unit comprising an electronic counter counting the timing signals and reset by the machine-cycle signals, the electronic counter having a set of outputs, the sequence-selecting means comprising a plurality of selector switches each associated with a respective station, each selector switch comprising a set of stationary contacts connected to respective outputs of the electronic counter and a moving contact engageable with any selected one of the stationary contacts, the moving contact being electrically connected to a respective one of the outputs of the control logic unit.

11. The machine defined in claim 10, each selector switch furthermore having a zero-setting to which the moving contact thereof can be moved for disconnecting the moving contact from the outputs of the electronic counter and thereby furnishing no start signal for the associated station.

12. The machine defined in claim 7, the control means furthermore including a plurality of flip-flops, each having a set input connected to an output of a respective time-delay stage and each having an output connected to the control input of a respective analog switch, and a plurality of end-position sensing means each sensing when the respective transfer means achieves a predetermined end position and in response thereto applying a signal to the reset input of the respective flip-flop.

13. The machine defined in claim 5, the control means furthermore including a plurality of feedback speed-regulating means, each speed-regulating means including tachometric means generating an actual-rpm signal indicating the rpm of the respective electric motor and means for automatically varying the power supply to the respective motor such that its rpm maintains the value indicated by the common desired-rpm signal.

14. The machine defined in claim 13, each feedback speed-regulating means furthermore including a transducer coupled to the respective motor and indicating the angular position of the output shaft of the respective motor and including means for automatically varying the power supply to the respective motor in dependence upon the angular position indicated by the respective transducer.

15. The machine defined in claim 7, said analog switches being first analog switches, the control means furthermore including low-speed selecting means generating a common low-desired-rpm signal for all the motors, a plurality of second analog switches each receiving the common low-desired-rpm signal and each having an output connected to the respective motor-activating means, and plural position-sensing means each operative for sensing the position of a respective transfer means and in response thereto rendering the respective first analog switch non-conductive and the respective second analog switch conductive, whereby to effect a switchover of the respective motor down to a low rpm preliminary to cutting off the power supply to the motor.

16. The machine defined in claim 15, each motor being cut off its power supply by the respective position-sensing means rendering the respective second analog switch non-conductive.

17. The machine defined in claim 7, the control means furthermore including manual start-signal means operative when manually activated for applying a start signal to the input of all the time-delay stages simultaneously, whereby to activate all transfer units simultaneously for check-out purposes or the like.

* * * * *